United States Patent [19]

Countryman

[11] Patent Number: 4,787,444
[45] Date of Patent: Nov. 29, 1988

[54] HEATING AND COOLING SYSTEM

[76] Inventor: James H. Countryman, 720 Peach Orchard Dr., West Carrollton, Ohio 45449

[21] Appl. No.: 562,918

[22] Filed: Dec. 19, 1983

[51] Int. Cl.[4] .............................................. F25B 29/00
[52] U.S. Cl. .................................. 165/48.2; 62/238.6; 126/435
[58] Field of Search ................. 165/485, 10; 62/238.6, 62/238.7, 59; 126/435

[56] References Cited

U.S. PATENT DOCUMENTS

| | | | |
|---|---|---|---|
| 2,142,856 | 1/1939 | Lieb et al. | 62/59 |
| 2,317,709 | 4/1943 | Alsiny | 62/59 X |
| 2,428,876 | 10/1947 | Hawkins | 126/415 |
| 2,990,693 | 7/1961 | Houplain | 62/59 X |
| 3,050,954 | 8/1962 | Royse | 62/59 X |
| 3,980,130 | 9/1976 | Thomason et al. | |
| 4,169,554 | 10/1979 | Camp. | |
| 4,269,167 | 5/1981 | Embree. | |
| 4,291,756 | 9/1981 | Bracht | 62/238.6 X |
| 4,313,424 | 2/1982 | Schreyer et al. | 126/435 X |
| 4,336,692 | 6/1982 | Ecker et al. | 62/238.6 |

FOREIGN PATENT DOCUMENTS 2465963  4/1981  France .................................. 62/59

OTHER PUBLICATIONS

Smay "Sci-block House-Winter's heating creates summer cooling", Popular Science Feb. 1977, pp. 82-84 & 152-154.

Primary Examiner—Ira S. Lazarus
Assistant Examiner—Peggy Neils
Attorney, Agent, or Firm—Killworth, Gottman, Hagan & Schaeff

[57] ABSTRACT

A heating and cooling system is provided which utilizes a heat exchange material such as water which undergoes reversible phase changes from a solid to a liquid phase during operation to store heat energy. The system includes a storage chamber, solar, ambient collector air distribution apparatus, water heater, a compressor, a first circulation loop between the storage chamber and air distribution apparatus for supplying heat and a second circulation loop between the storage chamber and air distribution apparatus for cooling, each loop containing a heat exchange fluid. The system has enhanced efficiency because it supplies heat at the low temperature required for environmental space heating and domestic hot water.

7 Claims, 3 Drawing Sheets

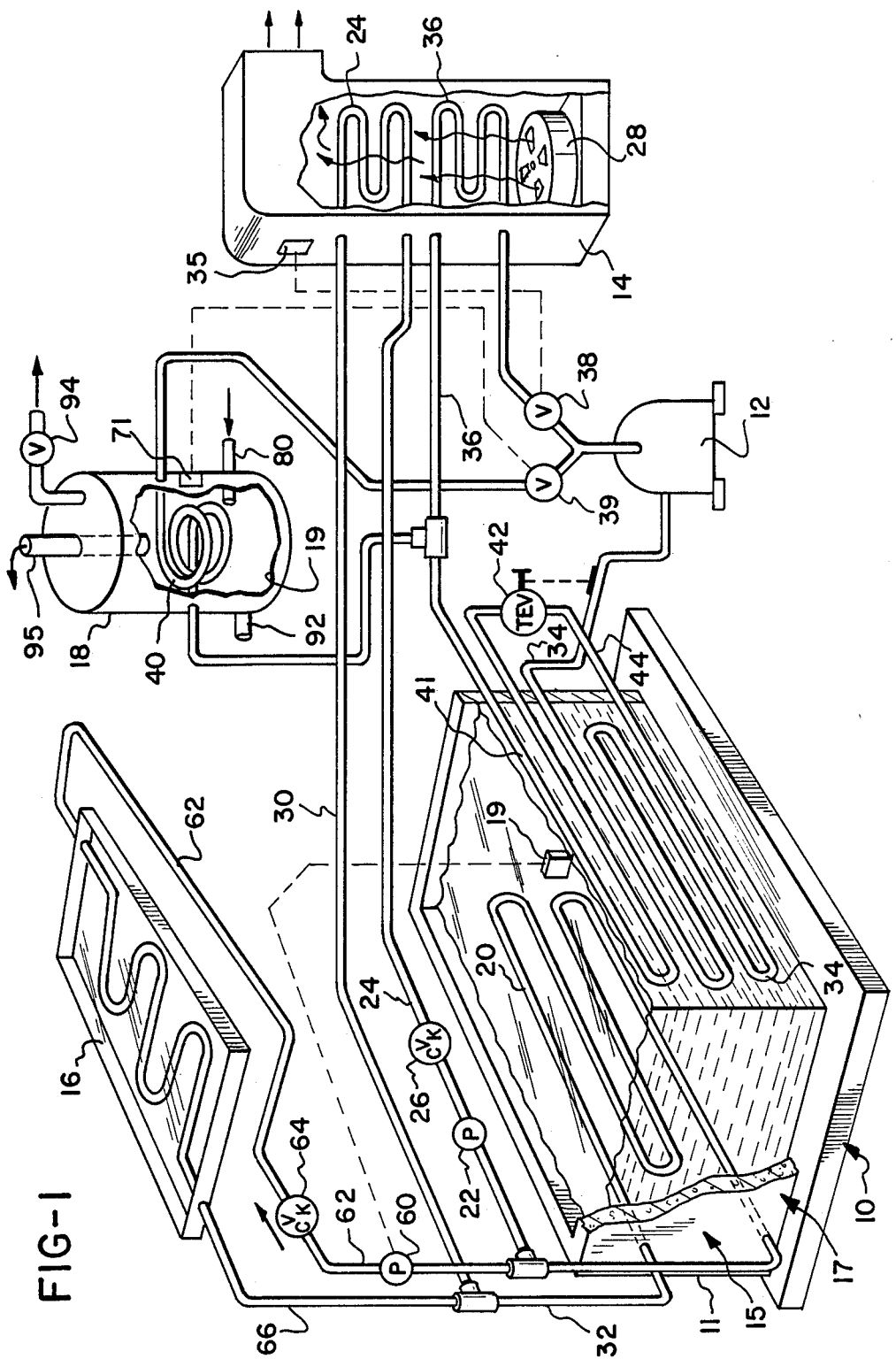

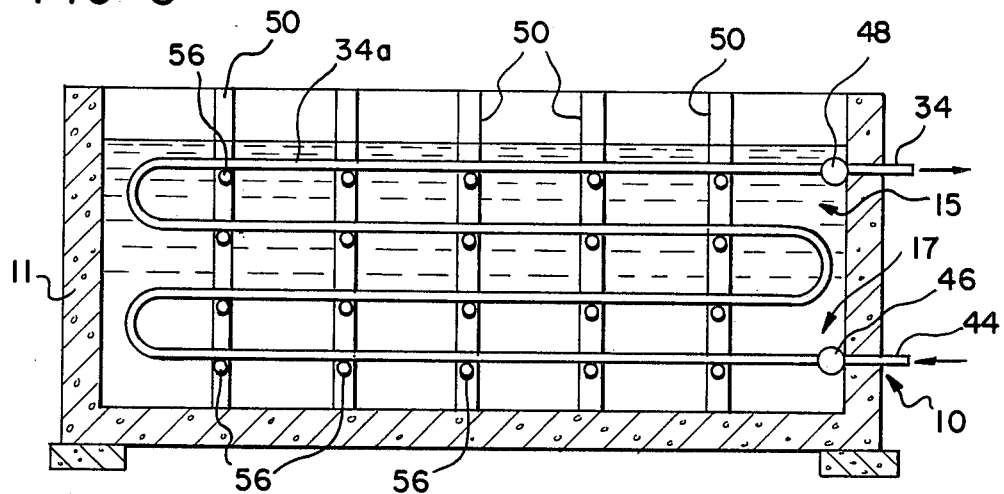
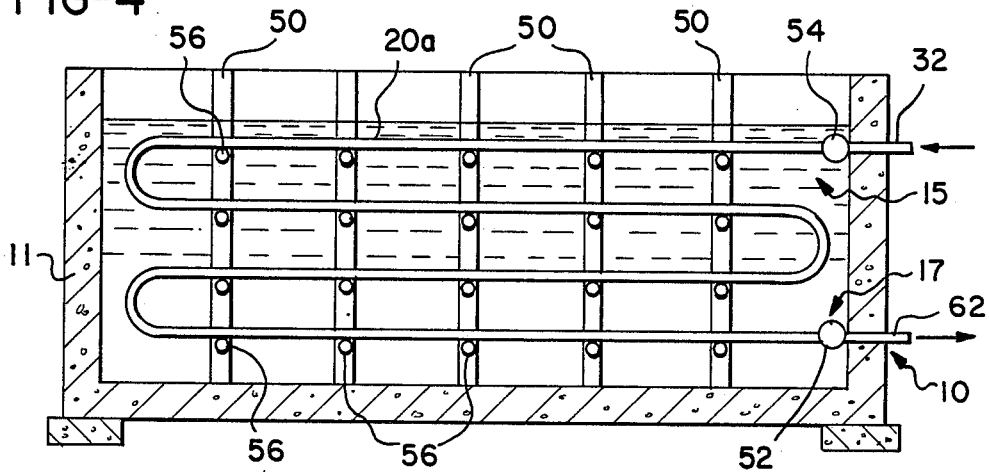

HEATING AND COOLING SYSTEM

BACKGROUND OF THE INVENTION

This invention relates to a heating and cooling system for environmental spaces and domestic hot water, and more particularly to a system which utilizes a heat exchange material which undergoes reversible phase changes during operation to store and release energy.

Due to the present concern over rapidly increasing costs of conventional energy forms, many systems have been developed to conserve the more expensive energy sources by utilizing heat from cheaper energy sources such as solar or geothermal heat. Heat stored by these systems is then used for domestic or commercial heating of buildings and water. Similar systems which store energy at relatively low temperatures have been developed for cooling buildings.

One example of a system which provides both heating and cooling through the use of hot and cold storage tanks is Thomason et al, U.S. Pat. No. 3,980,130. Thomason teaches the use of a heat transfer fluid such as water which accepts heat from a source of supply, such as a solar collector or an air conditioner compressor. Then, through a series of pumps and conduits, is transferred to either the hot or cold storage tank. This is accomplished by either directly dumping fluid into the tanks or by using a heat transfer coil to transfer heat from the operating liquid to the liquid stored in the tanks.

Various methods have been proposed for then removing the heat stored in the tanks to heat or cool a building. For example, in the above-mentioned '130 patent, the storage tanks are in heat transfer relationship with stones through which air is passed. The air is heated (or cooled as the case may be) by the stones and is then circulated through the air handling or ventilation system for the building. An alternative method which has also been used in the art is transferring heat through a separate set of coils extending into a storage tank with a separate heat transfer fluid therein. After picking up heat from the storage tank, the fluid is circulated through radiator-type coils positioned either in an air handling system or radiating directly to the interior of a building.

Another example of a heating and cooling system utilizing storage tanks is Camp, U.S. Pat. No. 4,169,554. Camp teaches a system which includes two storage tanks, one containing a material such as a wax that undergoes a phase change at 100°-140° F. and the other containing water. Solar collectors supply, via heat exchange coils, heat to the wax-containing tank which stores the heat until needed. Solar energy is also used to heat the water in the other tank for storage until needed. A conventional heat pump provides back-up heating when required.

The Camp system operates in a cooling mode by using a refrigeration cycle to chill the water in the second storage tank and form an ice mass during off-peak hours. That ice mass is then used to provide comfort cooling during peak hours. A conventional heat pump in the cooling mode provides back-up cooling when required. However, the system has only a limited storage capability and relies on the use of relatively expensive energy in the form of electricity to operate a compressor to form the ice mass.

An example of a heating and cooling system using an ice storage tank in an annual cycle energy system (ACES) is illustrated by the article "Ice Block House", Popular Science (February 1977). That article describes a system having a storage tank 20 feet by 20 feet by 4 feet deep in which water is frozen by drawing heat from it during the winter months for comfort heating and then is thawed during the summer months for comfort cooling. Energy costs are taught to be reduced substantially over a conventional heating and cooling system. The system takes advantage of the latent heat of fusion of water as well as sensible heat effects to reduce the overall size of the storage tank which is required. However, the system loses efficiency because it requires an antifreeze solution loop inside the storage tank in heat exchange relation to a refrigerant loop outside the storage tank to draw and use heat from the water/ice mixture in the storage tank. Another, one of the problems with the disclosed system is the buildup of ice on the antifreeze solution containing coils in the storage tank. As ice builds up, the rate of heat transfer to the antifreeze solution decreases and makes the system less efficient, thus requiring the use of defrost cycles and a specially constructed antifreeze solution loop in an attempt to shed the ice which forms.

Accordingly, the need still exists in the art for an efficient heating and cooling system for environmental spaces and domestic hot water which makes maximum utilization of energy sources.

SUMMARY OF THE INVENTION

The heating and cooling system of the present invention overcomes many of the disadvantages of previous systems by providing a system having improved heat transfer capabilities. According to one aspect of the present invention, the system in its simplest form comprises a storage chamber for holding a heat exchange material such as water, an air distribution apparatus, a first circulation loop having a conduit containing a first heat exchange fluid and extending between and into the storage chamber and air distribution apparatus, and a second circulation loop having a conduit containing a second heat exchange fluid and extending between and into the storage chamber and air distribution apparatus. The second circulation loop also includes a compressor for raising the pressure and temperature of the second heat exchange fluid in the second loop above the ambient temperature of the air from an environmental space entering the air distribution apparatus.

The positioning of the respective first and second conduits inside the storage chamber and the direction of fluid flow through these conduits are important aspects of the present invention which result in improved overall system efficiency. As the system is operated in its heating mode, heat energy is taken from the heat exchange material (e.g., water) in the storage chamber and transferred by the compressor and heat exchange fluid in the second conduit directly to the air distribution apparatus. This cools the heat exchange material eventually causing it to freeze. Water is a preferred heat exchange material in the practice of the invention because of its large heat of fusion of 144 BTU/lb and its low cost. Thus, each pound of water maintained in the storage chamber can release or absorb 144 BTU as it undergoes a reversible phase change from liquid to solid and back again.

Previous systems have suffered from the problem of ice build up on the heat exchange fluid-containing conduits within the storage chamber during the heating season. As ice builds up around the conduits, the rate of heat transfer from the heat exchange material in the chamber to the fluid in the conduits decreases since the ice acts as an insulator. The present invention directs the second heat exchange fluid-containing conduit to enter the storage chamber at a point adjacent a lower portion of the chamber and flow in a serpentine path upwardly through the chamber until it exits at a point in the upper portion of the chamber. In this manner, ice is caused to form first in the lower portion of the storage chamber and then taper off as the conduit traverses the chamber to its upper portion. The second heat exchange fluid is gradually warmed as it traverses its path from bottom to top of the storage chamber as it encounters the coldest ice first and then successively warmer ice, and finally, ice-free water in the upper portion of the chamber at 32° F. Additionally, means are provided in the storage chamber which secure the ice mass in position as it freezes.

The first heat exchange fluid in the first conduit is routed in substantially parallel relationship with and in close proximity to the second conduit through the storage chamber, it is flowed in countercurrent relationship to the flow of the fluid in the first conduit. When the system is switched to its cooling mode, the heat exchange fluid in the first conduit is cooled by the water-ice mixture in the storage chamber and is then circulated through the air distribution apparatus. Air passed over the first conduit is cooled and dehumidified as it flows into the environmental space.

Preferred embodiments of the present invention also include a solar/ambient collector and a domestic water heater as elements of the overall system. Heat exchange fluid heated in the solar/ambient collector is used only to melt excess ice built up in the storage tank during heating cycles. The water in the water heater is heated by the heat exchange fluid in the second conduit circulating directly from the compressor. Use of the compressor to heat the water in the water heater also enhances the summer cooling capacity of the system because of the heat energy it removes from the storage chamber.

Accordingly, it is an object of the present invention to provide an efficient heating and cooling system which makes maximum use of available energy sources. This and other objects and advantages of the present invention will become apparent from the following description, the accompanying drawings, and the appended claims.

BRIEF DESCRIPTION OF THE DRAWINGS

FIG. 1 is a somewhat schematic perspective view illustrating the heating and cooling system of the present invention;

FIG. 3 is an enlarged side sectional view of the storage chamber illustrating the arrangement of the second conduit means in the chamber;

FIG. 4 is an enlarged side sectional view of the storage chamber illustrating the arrangement of the first conduit means in the chamber.

DESCRIPTION OF THE PREFERRED EMBODIMENT

Figure 5:
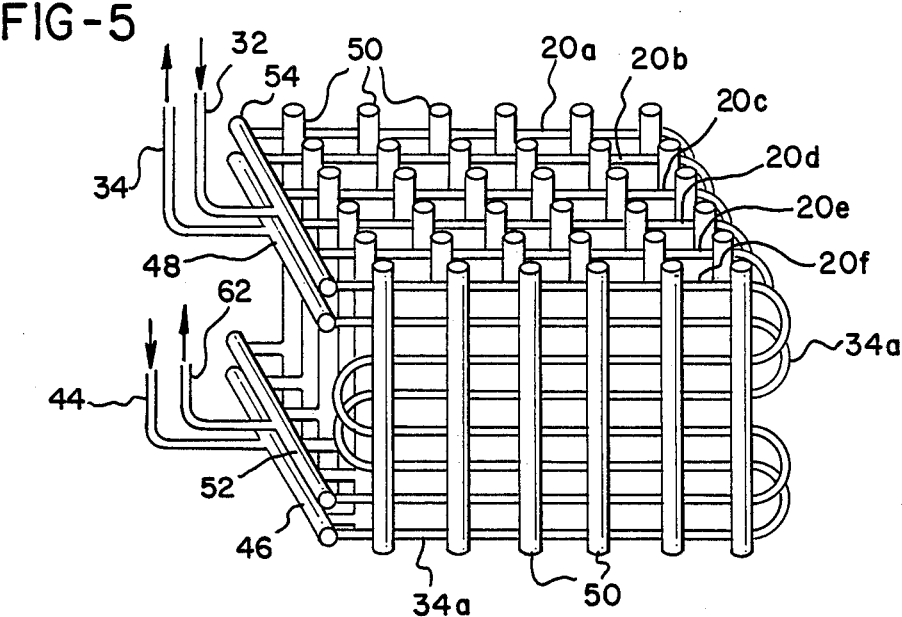
FIG. 5 is a perspective view of the arrangement of the conduit loops in the chamber.

Referring now to FIG. 1, the heating and cooling system of the present invention in its simplest form comprises a storage chamber 10, a compressor 12, and an air distribution apparatus 14. In its preferred form, the system also includes a solar/ambient collector 16 and a hot water tank 18. The system of the present invention is capable of operation in both heating and cooling cycles as will be explained in further detail below. Portions of the system can be operated in a variety of different modes during either the heating or cooling cycle by virtue of pumps and valving arrangements which can become operational or shut down as demands on the system change.

The chamber 10 has walls 11 which may be fabricated of concrete or concrete block construction and is made water-tight, preferably by the use of a vinyl liner or the like. Chamber 10 has an upper portion 15 and a lower portion 17. A concrete cover (not shown) seals the chamber when in use. The chamber 10 is also preferably insulated and buried below ground adjacent the environmental space such as a home or building which is to be heated and cooled by the system.

Water is the preferred heat exchange material stored in chamber 10 because of its large latent heat of fusion as it undergoes a reversible phase change at 32° F. The system of the present invention takes advantage of this ability to store and then release large amounts of heat energy (144 BTU/lb water) anytime during the yearly heating and cooling cycle. The storage chamber is sized to maintain a reserve of ice through the summer months depending upon the geographical area and climate in which the system is located.

Two sets of closed circulation loops are provided which extend into chamber 10. A first loop includes conduit 20 which contains a first heat exchange fluid which is circulated within it. Preferably, an antifreeze solution containing ethylene glycol and water is utilized as the first heat exchange fluid although other well known antifreeze solutions such as propylene glycol-water may also be utilized. When the system is in its cooling mode, the heat exchange fluid in conduit 20 is cooled by the heat exchange material in chamber 10 and is circulated via pump 22 through conduit 24 and check valve 26 to air distribution apparatus 14. There fan 28 circulates air from the environmental space over the relatively cold heat exchange fluid in conduit 24 to cool the air. A thermostat 35 in the living space senses a rise in temperature above a preset value and activates pump 22 and fan 28 in a conventional manner to provide cooling. The heat exchange fluid is then returned to chamber 10 through conduits 30 and 32. As shown schematically in FIG. 1, conduit 20 enters chamber 10 at a point adjacent upper portion 15 and traverses a serpentine path before exiting chamber 10 at a point adjacent lower portion 17.

A second circulation loop includes conduit 34 which is also located in chamber 10 and contains a second heat exchange fluid. Preferably, the second heat exchange fluid is a halogenated hydrocarbon refrigerant such as R-22. The refrigerant, at a relatively low pressure and approximately 16°-20° F., picks up heat from the water-ice mixture in chamber 10 which causes it to vaporize. As schematically shown in FIG. 1, conduit 44 containing refrigerant enters chamber 10 at a point adjacent lower portion 17 and traverses a serpentine path in countercurrent flow relationship to the fluid in conduit 20 before exiting chamber 10 at a point adjacent upper portion 15. The refrigerant in conduit 34 is then sent to compressor 12 where its pressure and temperature are raised to provide superheated refrigerant at approximately 200°–215° F. to coils 36 in air distribution apparatus 14. Valves 38 and 39 can be signaled by thermostats 35 and 71, respectively, to send the superheated refrigerant directly into air distribution apparatus 14 or directly into the base of water heater 18 to maintain the water therein at a preset temperature depending upon system demands. Thermostat 35 in the living space senses a drop in temperature below a preset value and activates compressor 12 and fan 28 in a conventional manner. Air in distribution apparatus 14 is circulated past coils 36 and is heated by the superheated vapor therein. The air is then circulated into the environmental space.

The partially-condensed refrigerant, still at a relatively high temperature (approximately 150° F.) is then circulated through temperature reduction coil 41 in chamber 10, emerging from chamber 10 at 60°–80° F. Sending refrigerant through coil 41 increases system efficiency by returning excess heat energy to the fluid in chamber 10 and reducing the load on thermal expansion valve 42. The further-condensed refrigerant is then sent through expansion valve 42 where its pressure and temperature are reduced causing it to condense and complete the cycle. The condense refrigerant is then returned to chamber 10 via conduit 44.

For the sake of simplicity and ease of understanding, only single conduits 20 and 34 are illustrated in chamber 10 in FIG. 1. However, it is contemplated that a plurality of individual conduits issuing from common manifolds may be used in the practice of the present invention. Such an embodiment is illustrated in FIGS. 3, 4, and 5, to which reference is now made. As shown, the refrigerant in conduit 44 is directed through inlet manifold 46 in the lower portion 17 of chamber 10 and is distributed into corresponding conduits such as 34a. The conduits form a series of serpentine loops which extend from near the bottom of chamber 10 to near the bottom surface thereof. An outlet manifold 48 in the upper portion 15 of chamber 10 collects the refrigerant from those conduits and sends it to the system through conduit 34.

The loops are supported by posts 50 having a series of lateral pegs 56 extending therefrom at a plurality of positions along the length of the posts. The posts 50 and pegs 56 also function to secure the ice mass which forms in the lower portion of chamber 10 in place. This prevents undesirable movement of the ice mass which could rupture the conduits. Alternatively, posts 50 may be hollow plastic posts and have a series of holes drilled therein. Conduits 20 and 34 may be laced through these holes to position them in place.

Additionally, because the ice mass is secured against movement, the level of the water in the chamber can be used as a measure of the ice to water ratio maintained in the chamber. A suitable control mechanism, such as float sensor 19 (see FIG. 1), can be installed to activate a system melt-back cycle (described in more detail below) which operates intermittently to retard the formation of or melt ice if too much ice forms in the chamber.

FIG. 4 illustrates a similar series of conduits 20a, 20b, 20c, 20d, 20e, and 20f for the heat exchange fluid in conduit 20. Inlet manifold 54 and outlet manifold 52 are provided to distribute and collect the fluid, respectively. As can be seen, the loops of conduits 20a–f enter the upper portion 15 of chamber 10 and then traverse a serpentine path downwardly through the chamber before being collected in outlet manifold 52 and exiting chamber 10 adjacent lower portion 17. As best shown in FIG. 5, the respective conduits follow substantially parallel spaced courses through chamber 10.

The temperature of the ice near the bottom of the chamber may be controlled at about 15°–20° F. All water in the chamber remains at 32° F.

In terms of system size, it has been determined that a storage chamber having dimensions of 8 ft×8 ft×16 ft. length and containing approximately 7680 gallons of water is adequate to supply the annual heating and cooling needs for an 1800 sq.ft. home located in the Dayton, Ohio area using a 2.5 ton compressor. Suitable heat transfer capabilities are provided through the use of approximately 560 ft. of nominal 5/16" I.D. copper tubing for the refrigerant conduit loops(34) and approximately 400 ft. of 7/16 inch nominal diameter copper tubing for the antifreeze conduit loops (20).

Referring back now to FIG. 1, if heating demands on the system result in the formation of excess ice in storage chamber 10, pump 60 is activated to circulate the heat exchange fluid in conduit section 62 through check 64 and into solar/ambient collector 16 where it picks up heat. This is accomplished through the use of a float sensor 19 located in storage chamber 10 which measures the level of the water and a second temperature sensor (not shown) located outdoors which measures the ambient temperature. The system is designed so that whenever the outdoor ambient temperature is above 32° F., pump 60 may be activated to melt back or add heat to the ice in the chamber. The water in chamber 10 is always maintained at about 32° F., but the ice temperature can be as low as 15° F., with the coldest ice being secured at the bottom of the chamber. The ratio of water to ice in the chamber is measured by sensing the water level in the chamber. Since when water freezes to form ice it expands approximately 10% in volume, a rising water level indicates that more ice has been formed in the chamber. By sensing the water level and controlling the amount of heat added back into the chamber via conduit 20, the ratio of water to ice in the chamber may be controlled so that there is no excessive ice build-up during the heating season.

It has been found that an efficient yet simple solar/ambient collector can be fashioned from a closed loop serpentine conduit which is suitably positioned to utilize the effects of the sun's rays. However, since the collector also functions by utilizing the heat available from the ambient temperature of the surroundings, direct sunlight on the collector is not necessary. More elaborate solar collection devices may also be used, but are not necessary. Moreover, since the temperature of the heat exchange fluid in the conduit need only be raised to a temperature slightly above the 15°–20° F. temperature of the ice mass to heat it, it has been found that the collector can be operated anytime the ambient air temperature is above 32° F. or anytime that there is sufficient sunshine to provide radiant heating to raise the temperature of the fluid in the collector to above 32° F. The heated fluid is returned to chamber 10 through conduit sections 66 and 32.

Hot water at standard temperatures (110°–160° F.) is also provided by the system. The use of superheated refrigerant supplied by compressor 12 through coils 40 has been previously discussed. For this purpose, a temperature sensor or thermostat 71 is provided in hot water tank 18. When the temperature of the water drops below a preset temperature, compressor 12 is activated and valve 39 is signaled to open to supply superheated refrigerant to water tank 18.

As illustrated in FIG. 1, cold water from a domestic supply line enters hot water tank 18 through insulated casing 19 at inlet 80 and is sent to the lower portion of the tank. There it is heated by superheated refrigerant in coils 40. Tank 18 is also provided with a relief valve 94 and a drain port 92. Heated water is sent into the domestic supply lines through hot water outlet 95.

Figure 2:
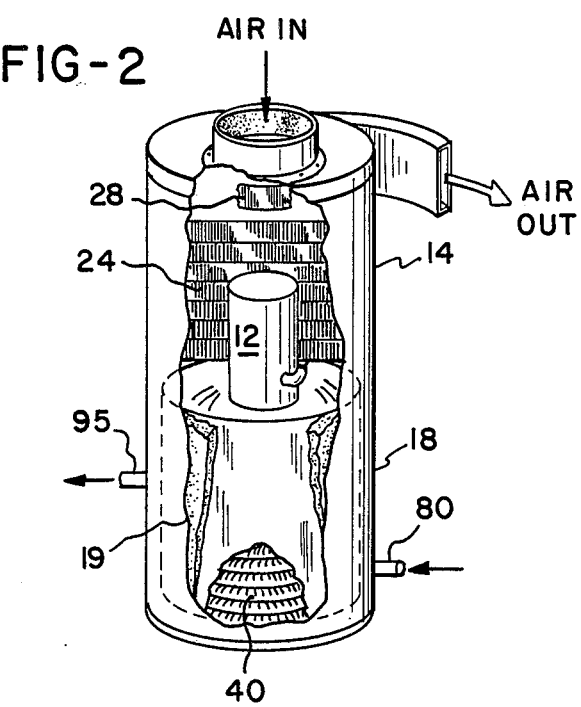
FIG. 2 is a sectional view of a combined air distribution-water heater apparatus which can be used in the practice of the present invention.

In a preferred embodiment of the invention, the compressor 12, air distributor 14, and hot water tank 18 may be combined into a single compact apparatus as best shown in FIG. 2. In this embodiment of the invention, water is heated solely through the use of superheated refrigerant in coils 40. As can be seen, hot water tank 18 forms the lower portion of the combined apparatus while compressor 12, conduits 24 and 36 (not shown), and fan 28 are mounted in the upper portion.

The heating and cooling system of the present invention is quite flexible and can be operated in a number of different modes to supply system demands. Pump can also be activated as previously described to provide melt-back of the ice mass in chamber 10 while compressor 12 is operating to supply both environmental and water heating requirements. Thermostats 35 and 71 signal valves 38 and 39 and compressor 12 to supply superheated refrigerant to air distribution apparatus 14, hot water tank 18, or both simultaneously depending on system demands. The combined compact apparatus illustrated in FIG. 2 results not only in a savings in equipment costs, but also allows for the use of ethylene glycol as the antifreeze solution and for a smaller storage capacity in chamber 10. This is because operation of the heat pump to produce hot water during the summer months will result in the formation of additional ice in chamber 10 which can then be used for cooling the environmental space. Other modes of operation will be readily apparent to those skilled in the art.

While the apparatus herein described constitutes a preferred embodiment of the invention, it is to be understood that the invention is not limited to this precise apparatus, and that changes may be made without departing from the scope of the invention, which is defined in the appended claims.

What is claimed is:

1. A heating and cooling system for an environmental space comprising in combination, an enclosed chamber having an upper portion and a lower portion containing a heat exchange material, means for distributing air to said environmental space, and means for transferring heat energy form said heat exchange material in said chamber to said air distributing means, said heat energy transferring means further maintaining at least a portion of said heat exchange material as a solid phase in the lower portion of said chamber and at leasts a portion of said heat exchange material as a liquid phase in the upper portion of said chamber and including, first conduit means containing a first heat exchange fluid extending between and into said chamber and said air distributing means, said system further including a pump for circulating said first heat exchange fluid, said first heat exchange fluid being circulated to said air distributing means to cause air flowing through said air distributing means to be cooled when said system is operated in a cooling mode, said heat energy transferring means further including second conduit means containing a second heat exchange fluid extending between and into said chamber and said air distributing means, said first conduit means being positioned such that said first heat exchange fluid contained therein enters said chamber at a point adjacent said upper portion of said chamber and exits said chamber at a point adjacent said lower portion of said chamber, said second conduit means being positioned such that said second heat exchange fluid enters said chamber at a point adjacent said lower portion of said chamber and exits said chamber at a point adjacent said upper portion of said chamber, respective portions of said first and second conduit means following substantially parallel, spaced courses through said chamber, and means for compressing said second heat exchange fluid in said second conduit means to raise its temperature to a temperature higher than the temperature of the air entering said air distributing means to cause said air to be heated when said system is operated in a heating mode.

2. The system of claim 1 in which said heat exchange material is water.

3. The system of claim 1 including means in said chamber for securing the solid phase portion of said heat exchange material against relative movement within said chamber.

4. The system of claim 1 including means for supplying water at from 110°–160° F. to said environmental space, said means for supplying water including a hot water storage tank in heat exchange communication with said second conduit means.

5. The system of claim 4 including a solar/ambient collector in heat exchange communication with said first heat exchange fluid in said first conduit means for supplying heat energy to said heat exchange material in said chamber to maintain at least a portion of said heat exchange material as a solid phase and at least a portion of said heat exchange material as a liquid phase.

6. The system of claim 4 including a thermal expansion valve for reducing the temperature and pressure of said second heat exchange fluid, said thermal expansion valve being located in said second conduit means between said hot water storage tank and said chamber.

7. The system of claim 6 wherein a portion of said second conduit means coming from said hot water storage tank enters said chamber adjacent said upper portion and exits therefrom prior to the location of said thermal expansion valve.

* * * * *